United States Patent
Cani et al.

(10) Patent No.: US 8,776,667 B2
(45) Date of Patent: Jul. 15, 2014

(54) SYSTEM FOR DETERMINING THE POSITION OF A PISTON ALONG ITS PATH OF TRAVEL FOR A FLUID-DYNAMIC ACTUATOR

(75) Inventors: Paolo Cani, Rio Saliceto (IT); Wainer Reggiani, Cortile di Carpi (IT)

(73) Assignee: A.M.A. S.p.A., San Martino in Rio (IT)

( * ) Notice: Subject to any disclaimer, the term of this patent is extended or adjusted under 35 U.S.C. 154(b) by 1063 days.

(21) Appl. No.: 12/734,296

(22) PCT Filed: Oct. 21, 2008

(86) PCT No.: PCT/IB2008/002811
§ 371 (c)(1),
(2), (4) Date: Jul. 8, 2010

(87) PCT Pub. No.: WO2009/053812
PCT Pub. Date: Apr. 30, 2009

(65) Prior Publication Data
US 2010/0282068 A1   Nov. 11, 2010

(30) Foreign Application Priority Data

Oct. 22, 2007 (IT) .............................. BO2007A0705
Oct. 22, 2007 (IT) .............................. BO2007A0706

(51) Int. Cl.
*F01B 25/04* (2006.01)
*F01B 31/12* (2006.01)
*F04B 49/00* (2006.01)

(52) U.S. Cl.
USPC .............................. 92/5 R; 73/114.28; 417/63

(58) Field of Classification Search
USPC ............ 73/114.28; 92/5 R; 250/206.1, 231.7, 250/231.8; 417/63
See application file for complete search history.

(56) References Cited

U.S. PATENT DOCUMENTS

| | | | | |
|---|---|---|---|---|
| 4,879,555 A | * | 11/1989 | Ichikawa et al. | 341/13 |
| 6,147,342 A | * | 11/2000 | Kucher | 250/231.13 |
| 2003/0197504 A1 | * | 10/2003 | Gray et al. | 324/207.24 |
| 2004/0222788 A1 | | 11/2004 | Low et al. | |
| 2006/0131417 A1 | * | 6/2006 | Kucher et al. | 235/462.01 |
| 2006/0191406 A1 | * | 8/2006 | Kucher et al. | 92/5 R |

FOREIGN PATENT DOCUMENTS

| | | |
|---|---|---|
| DE | 296 13 725 U1 | 8/1996 |
| EP | 0 591 614 A1 | 4/1994 |
| WO | WO 95/01510 | 1/1995 |

OTHER PUBLICATIONS

International Search Report, PCT/IB2008/002811, May 25, 2009.

* cited by examiner

*Primary Examiner* — Bryan Lettman
(74) *Attorney, Agent, or Firm* — Abelman, Frayne & Schwab

(57) ABSTRACT

A fluid-dynamic actuator having a detection system for determining the position of a piston along its path of travel within a cylinder. The piston includes a head and rod extending therefrom. First grooves are machined on respective sections of the rod. Projections of the first grooves onto a first plane parallel to the longitudinal axis of the rod define segments arranged obliquely with respect to the axis. Second grooves extend along the axis for predetermined lengths such that a respective number of second grooves run across each section. Optical sensors detect the presence of second grooves through a second plane transverse to the axis and a displacement of segments along a line coplanar with the second plane due to movement of the piston. A processor counts detected second grooves to determine the position of the piston as a function of the count of second grooves and the displacement of segments.

18 Claims, 1 Drawing Sheet

SYSTEM FOR DETERMINING THE POSITION OF A PISTON ALONG ITS PATH OF TRAVEL FOR A FLUID-DYNAMIC ACTUATOR

TECHNICAL FIELD

The present invention relates to a system for determining the position of a piston along its path of travel in a cylinder for a fluid-dynamic actuator.

In particular, the present invention is advantageously, but not exclusively applicable to a double-acting fluid-dynamic actuator, to which the following description specifically refers but without any loss of generality.

BACKGROUND ART

A double-acting fluid-dynamic actuator comprises a cylinder and a piston, which is movable inside the cylinder under the action of a pressurized fluid and is provided with a head that sealingly slides along the inside walls of the cylinder and a rod integral with the head.

A system for determining the position of a piston along its path of travel for a fluid-dynamic actuator of the type described above is known in the prior art. Said system normally comprises a magnetostrictive sensor suitable to be mounted with a first part on the rod and with a second part on the cylinder. In particular, the magnetostrictive sensor comprises a magnet that is mounted along the cylinder to generate an electromagnetic field through the rod and an element sensitive to the electromagnetic field inserted in a specific seat obtained inside the rod and connected electrically to a control unit. This type of sensor requires complex and expensive machining processes to produce both the cylinder and the rod of the piston.

Another known system for determining the position of a piston along its path of travel comprises an optical sensor and a decoding unit to read a series of binary codes on the rod, each consisting of a series of grooves, arranged according to a specific pattern that defines the code, on the outer surface of the rod transversely with respect to the longitudinal axis of the rod. The precision of the system is defined by the size of the grooves and the precision with which they are machined on the rod. This system has the advantage, compared to that using the magnetostrictive sensor, of not requiring any specific machining of the cylinder, but it still requires special and expensive machining of the rod to obtain good reading accuracy.

DISCLOSURE OF INVENTION

The purpose of the present invention is to provide a system for determining the position of a piston along its path of travel in a cylinder for a double-acting fluid-dynamic actuator, which achieves a good level of precision, overcomes the drawbacks described above and is, at the same time, easy and inexpensive to produce.

According to the present invention there are provided a system for determining the position of a piston along its path of travel in a cylinder for a fluid-dynamic actuator, and a fluid-dynamic actuator according to the appended claims.

BRIEF DESCRIPTION OF THE DRAWINGS

The present invention will now be described with reference to the accompanying drawings, illustrating a non-limiting embodiment thereof, in which.

BEST MODE FOR CARRYING OUT THE INVENTION

Figure 1:
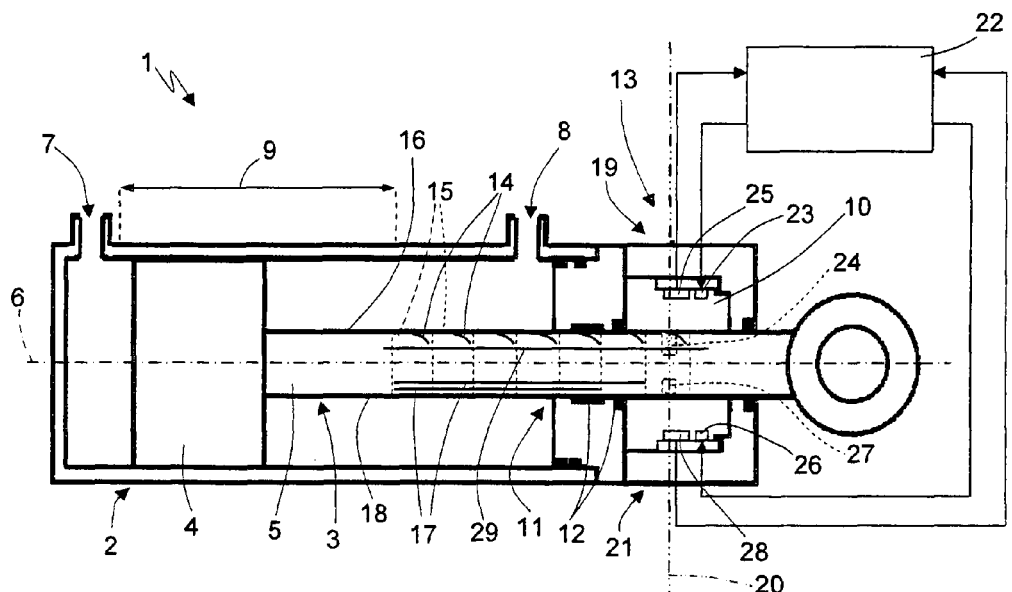
FIG. 1 is a partial longitudinal cross-sectional view of a double-acting fluid-dynamic actuator provided with the system for determining the position of the piston along its path of travel produced according to the present invention.

FIG. 1 is a partial longitudinal cross-sectional view of a double-acting fluid-dynamic actuator 1 comprising a cylinder 2 and a piston 3 movable inside the cylinder 2 under the action of a pressurized fluid (not illustrated). The piston 3 comprises a head 4 sealingly slidable along the internal walls of the cylinder 2 and a rod 5 integral with the head 4 and having a longitudinal axis 6, along which the cross-sectional view of FIG. 1 is defined. The cylinder 2 is provided with two apertures, a first of which is indicated by number 7 and allows the fluid to flow into and out of the cylinder 2 above the head 4, and a second of which is indicated by number 8 and allows the fluid to flow into and out of the cylinder 2 below the head 4, that is from the part with the rod 5. The piston 3 is movable along a rectilinear path of travel, which is indicated by number 9 and extends substantially between the apertures 7 and 8 parallel to the axis 6.

The actuator 1 also comprises a chamber 10 that is separate from the cylinder 2, but connected to the latter via an aperture 11 through which the rod 5 passes during the movement of the piston 3. The aperture 11 is provided with compression rings 12 to prevent the pressurized fluid from entering the chamber 10. Inside the chamber 10 there are housed various components of a system for determining the position of the piston 3 along its path of travel 9, said system being produced according to the present invention and indicated by number 13 in FIG. 1.

In particular, the system 13 comprises a number N1 of first curved grooves 14, which are partially visible in FIG. 1 and are machined on the outer surface of respective sections 15 of the rod 5 having the same length L so as to be arranged along a first portion of outer surface 16 of the rod 5 which extends in the direction of the length of the rod 5; and a second number N2 of second grooves 17, which are machined along a second portion of outer surface 18 and extend parallel to the axis 6 for respective lengths such that a respective number NI of said grooves 17 run across the outer surface of each of the sections 15. Only some of the grooves 17 are visible in FIG. 1. The second portion of outer surface 18 also extends in the direction of the length of the rod 5 and is diametrically opposite the first portion of outer surface 16.

The grooves 14 and 17 are machined by means of known methods using a laser beam to cut the outer surface of the rod 5 quickly and inexpensively. The depth of the grooves 14 and 17 is suitable to guarantee that the compression rings 12 also withhold the pressurized fluid in correspondence with the grooves 14 and 17. For example the depth can be not more than 50 μm.

The system 13 also comprises a first electro-optical unit 19 housed in the chamber 10 at the side of the rod 5 in a fixed position with respect to the cylinder 2 so as to detect a displacement of the grooves 14 along a direction that lies on a reading plane, the outline of which is indicated by number 20 in FIG. 1, orthogonal to the axis 6 and fixed with respect to the cylinder 2, the displacement being due to a movement of the rod 5 with respect to the cylinder 2 along the axis 6, i.e. a movement of the piston 3 with respect to the cylinder 2 along the path of travel 9; a second electro-optical unit 21 also housed in the chamber 10 in a fixed position with respect to the cylinder 2, but arranged at the side of the rod on the opposite side so as to detect the grooves 17 present in correspondence with the reading plane 20; and a control and processing unit 22 connected to the electro-optical units 19 and 21 to identify the section 15 present in correspondence with the reading plane 20 by counting the detected grooves 17 and to measure the position of the piston 3 along the path of travel 9 as a function of the identified section 15 and the displacement of the groove 14 of said section 15.

The first electro-optical unit 19 comprises a visible light illuminator 23 to illuminate an oblong and transversal sub-portion 24 of the portion of outer surface 16 arranged so as to be crossed longitudinally by the reading plane 20; and an optical sensor 25 consisting of a CCD (Charge Coupled Device) sensor with rows of pixels to detect the displacement of the groove 14 along the sub-portion 24. The second electro-optical unit 21 comprises a visible light illuminator 26 to illuminate an oblong and transversal sub-portion 27 of the portion of outer surface 18 arranged so as to be crossed longitudinally by the reading plane 20; and a plurality of optical sensors 28, only one of which is visible in FIG. 1 and each of which consists of a photodiode, or other type of optical sensor with the same simplicity of operation as the photodiode, and is suitable to detect the presence of a respective groove 17 in the sub-portion 27.

Lastly, the system 13 comprises a further groove 29 machined along the portion of outer surface 16 of the rod 5 so as to run across all the sections 15 of the rod 5 parallel to the axis 6. The groove 29 is machined using the method described previously for the grooves 14 and 17. The sub-portion 24 extends sufficiently so that the groove 29 is also illuminated by the illuminator 23 and a displacement of the groove 29 along the sub-portion 24 is detected by the optical sensor 25, said displacement being due to an undesirable rotation of the rod 5 with respect to the cylinder 2 about the axis 6, i.e. a rotation of the piston 3 with respect to the cylinder 2.

Figure 2:
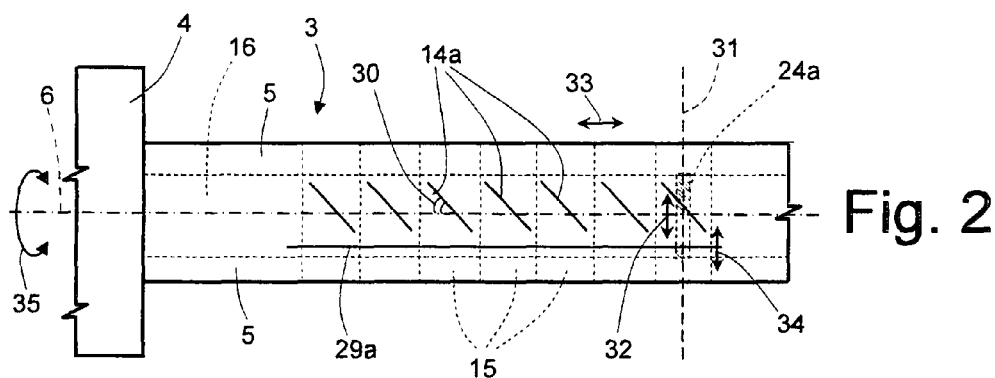
FIG. 2 is a schematic illustration of a top view of the rod of the piston of the actuator of FIG. 1.

FIG. 2 shows the rod 5 of the piston 3 from the perspective of the optical sensor 25, and in particular from a perspective defined hereinafter as a top view and parallel to the axis 6, in which the portion of outer surface 16 of the rod 5 is illustrated with a dashed line. The grooves 14 illustrated in FIG. 1 are machined on the portion of outer surface 16 in such way that respective projections of said grooves 14 onto a plane of observation corresponding to the top view define respective segments, indicated by number 14a in FIG. 2, parallel to one another and arranged obliquely with respect to a projection of the axis 6 onto the plane of observation. For the sake of simplicity and clarity, the projection of the axis is illustrated in FIG. 2 with the same number as the axis 6 illustrated in FIG. 1. The segments 14a form, with the projection of the axis 6, an acute angle 30 having a predefined size as a function of the desired reading sensitivity of the system 13, as explained more fully below.

In FIG. 2, number 24a indicates a reading zone defined by a projection of the sub-portion 24 (FIG. 1) onto said plane of observation. The reading zone 24a extends along a reading line 31 defined by the intersection of the plane of observation with the reading plane 20 (FIG. 1), the outline of which is not indicated in FIG. 2 in that it coincides with the reading line 31. The optical sensor 25 is suitable to acquire images of the reading zone 24a, from which it is possible to detect a displacement 32, along the reading line 31, of a point of the segment 14a of the section 15 framed by the optical sensor 25 and located by the intersection with said reading line 31, said displacement 32 corresponding to a displacement 33 of the rod 5 along the axis 6.

To guarantee good reading sensitivity, the acute angle 30 must be sufficiently big so that a small displacement 33 results in the variation of a sufficient number of pixels of the optical sensor 25 on the reading zone 24a. The value of the acute angle 30 is preferably in the range of between 45° and 60°.

The optimal number N1 is established as a function of the length of the path of travel 9 and the diameter of the rod 5. Sensitivity being equal, the longer the path of travel 9 the greater the number (N1) of sections 15 needed. Moreover, the bigger the diameter of the rod 5, the smaller the number of sections 15 needed. The optical sensor 25 must bring into focus images of the sub-portion 24 which is a curved surface and is thus not equidistant from the line of pixels. To achieve a good level of accuracy, the optical sensor 25 must only bring into focus the central part of the surface of the rod 5, which means the length of the grooves 14 must be reduced and the number of sections 11 needed to cover the path of travel 9 must be increased.

Again with reference to FIG. 2, a projection of the groove 29 onto the plane of observation defines a further segment, indicated with number 29a, extending along the series of segments 14a parallel to the projection of the axis 6. The reading zone 24a extends until intercepting the segment 29a so that from the images acquired by the optical sensor 25 it is possible to detect a displacement 34, along the reading line 31, of a point of the segment 29a located by the intersection with said reading line 31, said displacement 34 corresponding to an undesirable rotation 35 of the rod about the axis 6.

Figure 3:
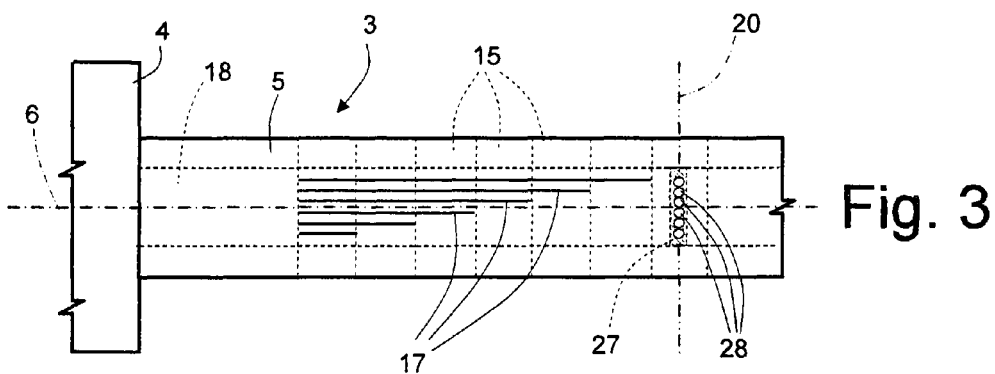
FIG. 3 is a schematic illustration of a bottom view of the rod of the piston of the actuator of FIG. 1.

FIG. 3 shows the rod 5 of the piston 3 from the perspective of the optical sensors 28, and in particular from a perspective defined hereinafter as a bottom view and parallel to the axis 6, in which the portion of outer surface 18 of the rod 5 is illustrated with a dashed line. With reference to FIG. 3, the grooves 17 extend side by side and parallel to the axis 6 for respective lengths such that a respective number NI of said grooves 17 run across each section 15. In this way, each section 15 is identifiable by the respective number NI. The minimum number N2 of grooves 17 to identify all the sections 15 in this way is given by $$N2 = N1 - 1.$$

In the example of embodiment of the present invention illustrated in the figures, the system 13 envisages seven grooves 14, i.e. N1=7 (FIG. 2), and six grooves 17, i.e. N2=6 (FIG. 3) which generate the following series of numbers NI: 0, 1, 2, 3, 4, 5, 6.

In other words, one of the sections 15 is identified by a zero number NI (NI=0) of grooves 17. In the example of embodiment illustrated in FIG. 3, the ends of the grooves 17 closest to the head 4 of the piston 3 are substantially aligned with one another so that the section 15 with the zero number NI is that furthest from the head 4 of the piston 3.

In FIG. 3 the arrangement of the optical sensors is also schematically illustrated. Said optical sensors 28 are aligned along the reading plane 20 at respective distances from the rod 5 so that each one detects the presence of the respective groove 17 in the sub-portion 27 of the portion of outer surface 18 illuminated by the illuminator 26.

The control and processing unit 22 is configured to perform the following operations: count the grooves 17 detected by the optical sensors 28 on the sub-portion 27 so as to locate the section 15 present in correspondence with the reading plane 20, i.e. to select the number NI; measure the displacement 32 of the segment 14a of the identified section 15 and the displacement 34 of the segment 29a from the images acquired via the optical sensor 25; calculate a compensation factor of the rotation of the rod 5 as a function of the displacement 34 of the segment 29a; process the displacement 32 with the compensation factor to obtain a compensated displacement that takes into account the errors on said displacement 32 caused by any undesirable rotations of the rod 5; calculate the displacement 33 of the rod 5 as a function of the compensated displacement and the acute angle 30 using a simple trigonometrical process; and calculate the position of the piston 3 along the path of travel 9 as a function of the identified section 15, the length L of the sections 15 and of the displacement 33.

For example, supposing that the reference position of the piston 3 is that in which the head 4 is at the minimum distance from the aperture 7, the absolute value of the position of the piston 3 along the path of travel 9 is obtained by multiplying the length L by the number NI and adding the displacement 33 to the result.

The displacement 32 of the segment 14a of the identified section 15 can be measured with respect to a fixed point (not illustrated) of the reading line 31. Alternatively, the displacement 32 can be measured as the distance between the segment 14a and the segment 29a along the reading line 31, i.e. as the distance between a point of intersection of the segment 14a with the reading line 31 and the point of intersection of the segment 29a with the reading line 31. In the latter case, the undesirable rotation 35 of the rod 5 produces a change in said distance between the segment 14a and the segment 29a that is, in the majority of cases, negligible, i.e. such as to make the detection of the displacement 34 optional and thus make the calculation of the compensation factor of the rotation of the rod 5 optional; in other words, the displacement 33 can be calculated directly as a function of the displacement 32 and of the acute angle 30.

According to a further embodiment of the present invention, not illustrated herein, the ends of the grooves 17 furthest from the head 4 of the piston 3 are substantially aligned in relation to one another so that the section 15 where the number NI is zero is that closest to the head 4 of the piston 3.

According to a further embodiment of the present invention, not illustrated herein, the illuminator 26 comprises a plurality of illuminating units, each of which is associated with a respective optical sensor 28, so as to illuminate respective sub-portions of the portion of outer surface 18 in correspondence with respective directions defined by the grooves 17. With this solution it is possible to improve the efficiency of the single optical sensors 28.

According to a further embodiment of the present invention, not illustrated herein, the grooves 17 are machined along the portion of outer surface 16 alongside the grooves 14, the electro-optical unit 21 is absent and the electro-optical unit 19 is also used to detect the grooves 17 in correspondence with the reading plane 20. In particular, the size of the reading zone 24a is such that the grooves 17 are also visible from the relative images acquired by the optical sensor 25 and the control and processing unit 22 is configured to count the grooves 17 from the image of the reading zone 24a. This embodiment, without the second electro-optical unit 21, is particularly advantageous for rods 5 with large diameters.

According to a further embodiment of the present invention, not illustrated herein, the system 13 comprises a single groove 14 (N1=1), and thus no groove 17 (N2=0), and the acute angle 30 can be less than 45°. Consequently the second electro-optical unit 21 is absent. This embodiment, which also does without the second electro-optical unit 21, is particularly advantageous for rods 5 with large diameters or for pistons 3 with a very short path of travel 9.

The main advantage of the system 13 for determining the position of the piston 3 along its path of travel 9 described above is that it is simple and inexpensive to produce while guaranteeing a good level of precision, regardless of the length of the path of travel 9 and diameter of the rod 5. The number N1 of the sections 15 comprising the grooves 14 can vary as a function of the length of the path of travel 9, while maintaining good reading sensitivity which is guaranteed by the size of the acute angle 30, and as a function of the diameter of the rod 5, while maintaining good reading precision guaranteed by the correct length of the grooves 14. Moreover, the system 13 is inexpensive to produce in that it only uses a CCD sensor 25 to acquire the optical images that require precision and sensitivity and a plurality of optical sensors 28 of a more economical type (single photodiodes) to acquire optical images that require less precision. Lastly, the embodiments without the second electro-optical unit 21 are particularly advantageous for pistons 3 with a large diameter rod 5 and/or a short path of travel 9.

The invention claimed is:

1. A fluid-dynamic actuator comprising: a cylinder (2) and a piston (3), which includes a rod (5) having a longitudinal axis (6); the piston (3) being movable inside the cylinder (2) along a path of travel (9) parallel to said axis (6); the actuator (1) further including a detection system (13) for determining a position of the piston (3) along a path of travel (9), and wherein said detection system (13) comprises: a plurality of first grooves (14), which are machined on an outer surface of respective sections (15) of the rod (5) so that respective projections of the first grooves (14) onto a first plane parallel to the axis (6) define respective first segments (14a) parallel to one another and arranged obliquely with respect to a projection of the axis (6) onto the first plane; a plurality of second grooves (17), which are machined on an outer surface of the rod (5) and extend parallel to the axis (6) for respective lengths such that a respective number of second grooves (17) run across the outer surface of each of the sections (15); optical sensing means (19, 21) to detect the presence of second grooves (17) in correspondence with a second plane (20) transversal to the axis (6) and fixed with respect to the cylinder (2) and a first displacement (32) of the first segments (14a) along a reading line (31) defined by an intersection of the second plane (20) with the first plane, said first displacement (32) being due to a movement of the piston (3) along the path of travel (9); and processing means (22) to identify the section (15) of rod (5) present in correspondence with the second plane (20) by counting the detected second grooves (17) and to measure the position of the piston (3) along the path of travel (9) as a function of the identified section (15) and of said first displacement (32).

2. The actuator according to claim 1, wherein said first segments (14a) form, with said projection of the axis (6), an acute angle (30) having a defined value; said processing means (22) being suitable to determine said position of the piston (3) along the path of travel (9) as a function of the acute angle (30).

3. The actuator according to claim 2, wherein said acute angle (30) has a value in the range of between and 45 degrees and 60 degrees.

4. The actuator according to claim 1, wherein said second plane (20) is perpendicular to said longitudinal axis (6).

5. The actuator according to claim 1, wherein said sections (15) of the rod (5) are of a same length (L); said processing means (22) being suitable to determine said position of the piston (3) along the path of travel (9) as a function of said length (L).

6. The actuator according to claim 1, wherein a second number (N2) of said plurality of second grooves is equal to a first number (N1) of said plurality of first grooves minus one so that a zero number of said second grooves (17) run across the outer surface of at least one of said sections (15).

7. The actuator according to claim 1, comprising a third groove (29) which is machined on said outer surface of the rod (5) so that a projection of the third groove (29) onto said first plane defines a second segment (29a) parallel to said axis (6); said optical sensing means (19, 21) being suitable to detect a second displacement (34) of the second segment (29a) along said reading line (31), said second displacement (34) being due to a rotation of said piston (3) with respect to said cylinder (2) about said axis (6); said processing means (22) being suitable to determine said position of the piston (3) along the path of travel (9) as a function of the second displacement (34).

8. The actuator according to claim 7, wherein said processing means (22) is are configured to calculate a compensation factor of said rotation of the piston (3) as a function of said second displacement (34) and to process said first displacement (32) with the compensation factor in order to determine said position of the piston (3) along the path of travel (9).

9. The actuator according to claim 7, wherein said plurality of first grooves (14) are arranged along a first portion of outer surface (16) of the rod (5); said optical sensing means (19, 21) comprising a first illuminator (23), which is arranged alongside the rod (5) so as to illuminate a first sub-portion of surface (24) of said first portion of outer surface (16) so that a projection of the first sub-portion of surface (24) onto said first plane defines a reading zone (24a) extending along said reading line (31), and a first optical sensor (25) to acquire an image of the reading zone (24a) such that said first displacement (32) and said second displacement (34) are detectable on said image.

10. The actuator according to claim 1, comprising a third groove (29) which is machined on said outer surface of the rod (5) so that a projection of the third groove (29) onto said first plane defines a second segment (29a) parallel to said axis (6); said processing means (22) being configured to measure said first displacement (32) as the distance between the first segment (14a) of said identified section (15) of rod (5) and said second segment (29a) along said reading line (31).

11. The actuator according to claim 1, wherein said plurality of first grooves (14) are arranged along a first portion of an outer surface (16) of the rod (5); said optical sensing means (19, 21) comprising a first illuminator (23), which is arranged alongside the rod (5) so as to illuminate a first sub-portion (24) of the first portion of outer surface (16) so that a projection of the first sub-portion (24) onto said first plane defines a reading zone (31) extending along said reading line (31), and a first optical sensor (25) to acquire an image of the reading zone (24a) such that said first displacement (32) is detectable on said image.

12. The actuator according to claim 11, wherein said first optical sensor (25) comprises a CCD sensor.

13. The actuator according to claim 1, wherein said plurality of second grooves (17) are arranged along a second portion of outer surface (18) of the rod (5); said optical sensing means (19, 21) comprising at least a second illuminator arranged alongside the rod (5) so as to illuminate a second sub-portion of surface (27) of said second portion of outer surface (18) having an elongated form and being arranged so as to be crossed longitudinally by said second plane (20), and a plurality of second sensors (28), each of which to detect the presence of a respective one of said second grooves (17) in the second sub-portion of surface (27).

14. The actuator according to claim 13, wherein said plurality of first grooves (14) are arranged along a first portion of outer surface (16) of the rod (5); said second portion of outer surface (18) of the rod (5) being diametrically opposite said first portion of outer surface (16).

15. The actuator according to claim 13, wherein each of said second optical sensors (28) consists of a photodiode.

16. The actuator according to claim 13, wherein said second illuminator (26) comprises a plurality of illuminating units, each of which is associated with a respective one of said optical sensors (28).

17. The actuator according to claim 1 comprising a chamber (10) separate from said cylinder (2) and through which said rod (5) passes slidingly; said optical sensing means (19, 21) being housed inside the chamber (10).

18. The actuator according to claim 17, wherein said piston (3) is movable inside said cylinder (2) under the action of a pressurized fluid; the cylinder (2) and said chamber (10) being connected via an aperture (11) through which said rod (5) passes and which is provided with compression rings (12) to prevent the pressurized fluid from entering the chamber (10).

* * * * *